(12) United States Patent
Wada

(10) Patent No.: US 10,191,218 B2
(45) Date of Patent: Jan. 29, 2019

(54) OPTICAL ELEMENT AND OPTICAL CONNECTOR

(71) Applicant: Konica Minolta, Inc., Tokyo (JP)

(72) Inventor: Kazuhiro Wada, Machida (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/979,571

(22) Filed: May 15, 2018

(65) Prior Publication Data

US 2018/0335571 A1 Nov. 22, 2018

(30) Foreign Application Priority Data

May 17, 2017 (JP) ................................ 2017-097971

(51) Int. Cl.
| G02B 6/32 | (2006.01) |
| G02B 6/26 | (2006.01) |
| G02B 27/09 | (2006.01) |
| G02B 6/38 | (2006.01) |

(52) U.S. Cl.
CPC ............. *G02B 6/32* (2013.01); *G02B 6/262* (2013.01); *G02B 6/3885* (2013.01); *G02B 27/0961* (2013.01)

(58) Field of Classification Search
None
See application file for complete search history.

(56) References Cited

U.S. PATENT DOCUMENTS

| 5,241,612 A * | 8/1993 | Iwama | G02B 6/32 385/59 |
| 2001/0021287 A1* | 9/2001 | Jewell | G02B 6/4206 385/14 |
| 2011/0026882 A1* | 2/2011 | Budd | G02B 6/32 385/52 |
| 2014/0133803 A1* | 5/2014 | Rosenberg | G02B 6/3885 385/33 |
| 2014/0321814 A1* | 10/2014 | Chen | G02B 6/32 385/79 |
| 2015/0104135 A1* | 4/2015 | Bushnell | G02B 6/325 385/79 |
| 2015/0139590 A1* | 5/2015 | Oniki | G02B 6/4249 385/79 |
| 2016/0041344 A1* | 2/2016 | Wasserbauer | G02B 6/3853 385/78 |

FOREIGN PATENT DOCUMENTS

| JP | 5-297245 A | * 11/1993 |
| JP | H05-297245 A | 11/1993 |
| JP | 2006-163204 A | * 6/2006 |
| JP | 2016-133518 A | 7/2016 |

OTHER PUBLICATIONS

Extended European Search Report issued in corresponding European Application No. 18170069.1 dated Sep. 12, 2018 (8 pages).

* cited by examiner

*Primary Examiner* — Michael Stahl
(74) *Attorney, Agent, or Firm* — Osha Liang LLP

(57) ABSTRACT

An optical element is coupled to a ferrule that holds an optical fiber for single mode. The optical element includes: a glass-made optical portion in which a plurality of lenses is disposed; and a resin-made holder that holds the optical portion. The lenses are disposed with respect to an end portion of the optical fiber, using at least a part of the holder.

9 Claims, 8 Drawing Sheets

OPTICAL ELEMENT AND OPTICAL CONNECTOR

CROSS-REFERENCE TO RELATED APPLICATIONS

The entire disclosure of Japanese patent Application No. 2017-097971, filed on May 17, 2017, is incorporated herein by reference in its entirety.

BACKGROUND

Technological Field

The present invention relates to an optical element and an optical connector suitably used for optical communication and the like.

Description of the Related art

Increases in size and in speed of information/signal processing have been in progress in various information/signal processing devices including a network device such as a router, a server, and a large computer. In these devices, signal transmission between a CPU and a memory in a circuit board (board), between wiring boards, between devices (racks), and the like has been conventionally performed by electrical wiring. However, in view of superiority in terms of transmission speed, transmission capacity, power consumption, radiation from a transmission path, interference of electromagnetic waves with a transmission path, and the like, so-called optical interconnection in which signals are transmitted by light using optical fibers or the like as a transmission path is beginning to be actually introduced in place of the above-described electrical wiring. In the optical interconnection, an optical connector is used to perform optical coupling between optical fibers. A typical optical connector has a lens that condenses light emitted from an end portion of one optical fiber to an end of the other optical fiber.

By the way, in recent years, the amount of optical communication information has been steadily increasing, and in addition, long-distance and high-speed transmission of information is desired. However, in the case of a conventionally used multimode fiber, optical fibers having core diameters of 50 µm and 62.5 µm are adopted, and an optical signal is transmitted in a plurality of modes. Therefore, a time lag is caused between arrival times of the signal and there will be an occurrence of mode dispersion. Therefore, a data loss occurs due to the mode dispersion, and thus the long-distance and high-speed transmission is considered unsuitable.

In contrast, a single-mode fiber is an extremely small-diameter optical fiber having a mode field diameter of about 9 µm, and has an advantage of suppressing attenuation as much as possible by setting propagation of an optical signal to one mode. Therefore, unlike the transmission method using many modes like the multimode fiber, the arrival time of the signal is single, and thus the single-mode fiber has no mode loss and is suitable for the long-distance and high-speed transmission. Therefore, opportunities to use the single-mode fiber have been increasing.

However, in using the single-mode fiber, the tolerance of core misalignment becomes narrow in optically coupling the optical fibers using an optical connector because the mode field diameter is as small as about 9 um. In addition, core misalignment may occur due to environmental temperature change. Detailed description will be given below.

A typical optical connector often couples multicore optical fiber bodies in which a plurality of cores is bundled together for the purpose of an increase in the amount of information. An optical connector used for such purpose generally includes a member for holding a multicore optical fiber body called ferrule, and an optical element disposed between a pair of ferrules and in which a plurality of lenses for effectively propagating light between a plurality of core ends held by the ferrules is formed.

However, even when the optical fibers are coupled using the optical connector with high precision, if a difference in thermal expansion occurs in each part due to the environmental temperature change, there is a risk of an increase in the loss due to misalignment of a coupled part, or the like. Here, the optical fiber is made of glass and the ferrule is often molded from a resin mixed with a glass fiber. The resin mixed with a glass fiber has a characteristic in which a linear expansion coefficient approximates that of glass. Therefore, a difference in thermal expansion can be said to less easily occur between the optical fiber and the ferrule. Meanwhile, the optical element is required to have a predetermined optical characteristic, and thus selection of material is a challenge. In the case where the lens is made of glass, for example, the linear expansion coefficient approximates those of the optical fiber and the ferrule, and thus the misalignment at the time of optical coupling less easily occur but the cost may increase. Further, since glass is generally difficult to mold, there is a challenge of how to provide a structure to position the glass-made optical element and the ferrule.

If the optical element is made of a resin containing a glass fiber by using the technique of JP 2016-133518 A, for example, a fitting hole for positioning can be formed with high precision, and the linear expansion difference between the optical element and the ferrule can be suppressed at the same time, thereby suppressing the efficiency loss when an environmental temperature changes.

However, it is technically difficult to match the refractive index and the temperature characteristics to a level that satisfies the optical characteristic in the material of the resin containing a glass fiber, and the resin is generally colored when mixed with the glass fiber, and the optical transmittance decreases due to the coloring. Therefore, it is difficult to use the resin containing a glass fiber for the optical element that is used for the optical connector.

SUMMARY

One or more embodiments of the present invention provide an optical connector and an optical element, used for the optical connector, that are inexpensive and capable of suppressing a loss at the time of environmental temperature change.

According to one or more embodiments of the present invention, an optical element to be coupled to a ferrule that holds an optical fiber for single mode, the optical element includes: a glass-made optical portion in which a plurality of lenses is formed; and a resin-made holder that holds the optical portion, wherein the lens is positioned with respect to an end portion of the optical fiber held by the ferrule, using at least a part of the holder.

BRIEF DESCRIPTION OF DRAWINGS

Features provided by one or more embodiments of the invention will become more fully understood from the detailed description given hereinbelow and the appended drawings which are given by way of illustration only, and thus are not intended as a definition of the limits of the embodiments of the present invention.

DETAILED DESCRIPTION

Hereinafter, one or more embodiments of the present invention will be described with reference to the drawings. However, the scope of the invention is not limited to the disclosed embodiments.

Figure 1:
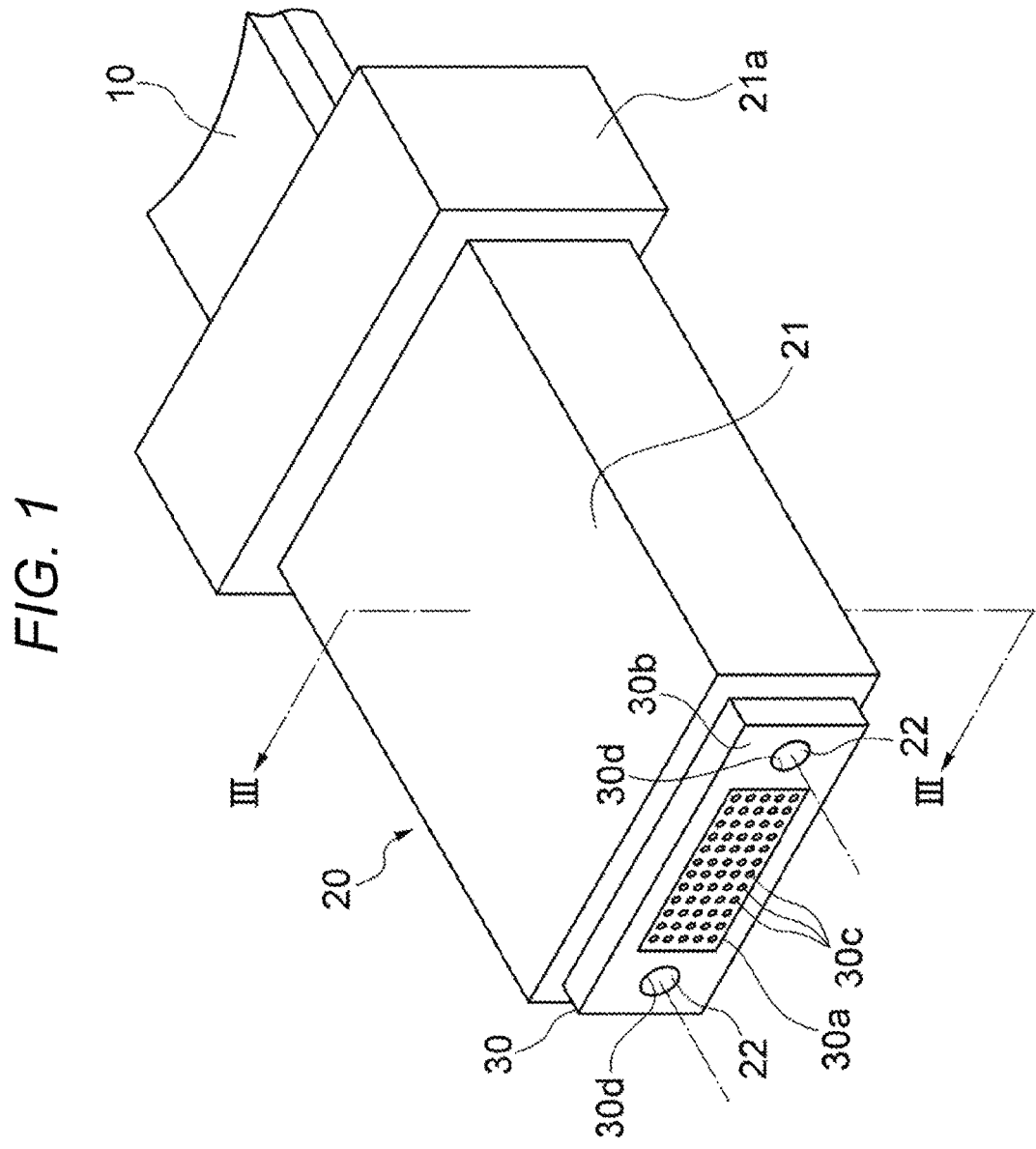
FIG. 1 is a perspective view of an optical connector according to one or more embodiments.
Figure 2:
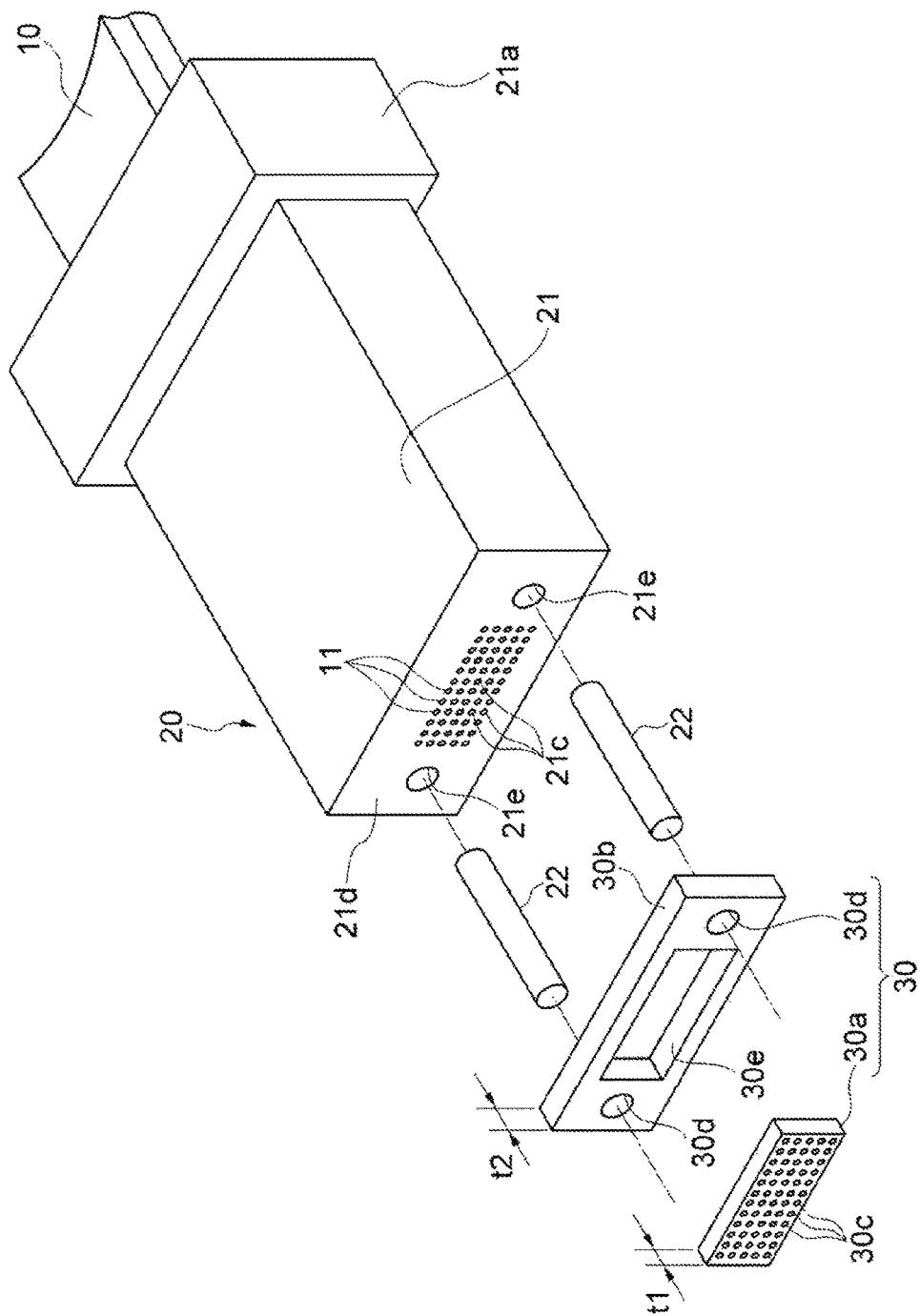
FIG. 2 is an exploded view of the optical connector in accordance with one or more embodiments.
Figure 3:
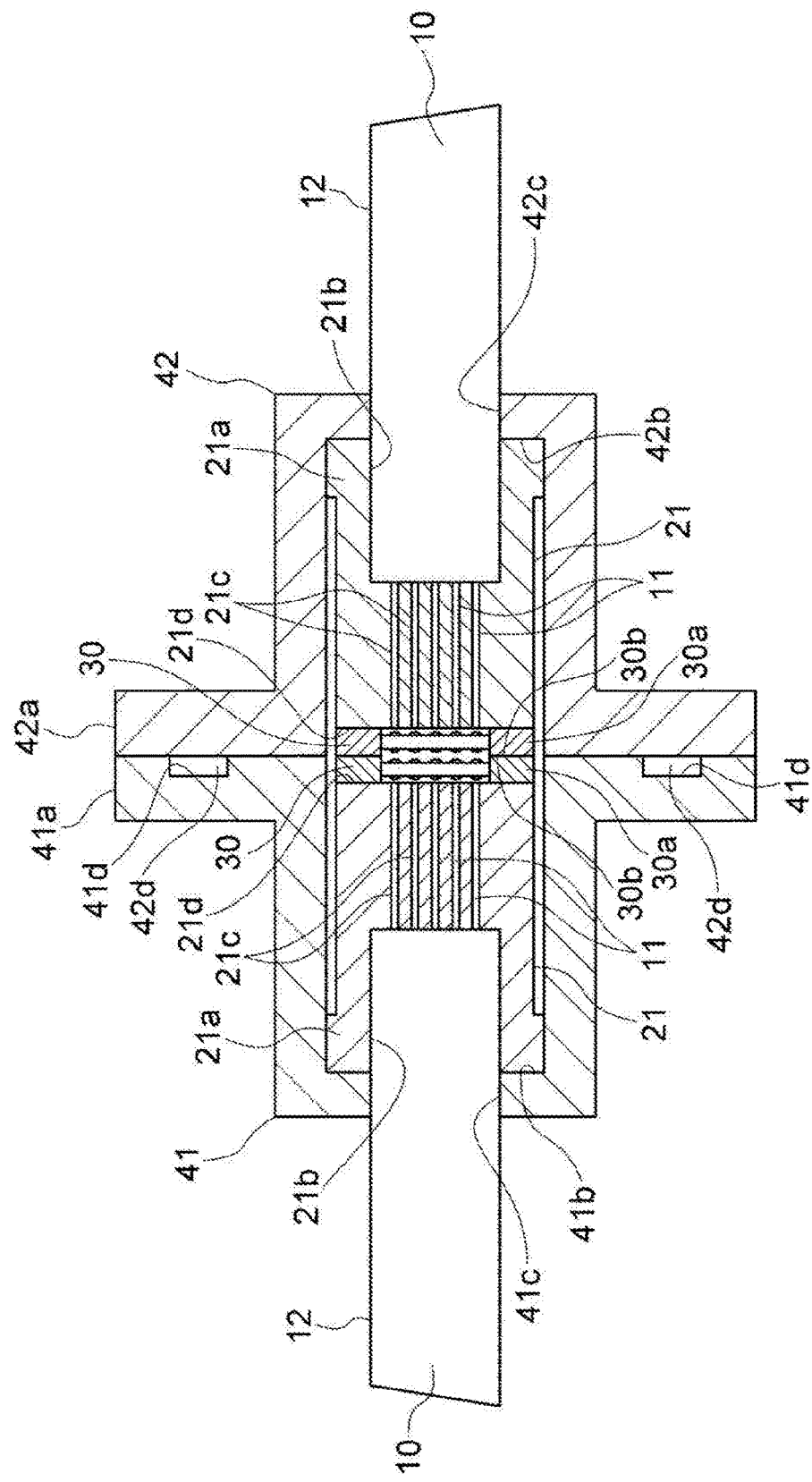
FIG. 3 is a view taken along a vertical plane passing through a line in FIG. 1 and viewed in a direction of arrows in a state where a pair of optical connectors is connected using a coupler.

Hereinafter, embodiments of the present invention will be described with reference to the drawings. FIG. 1 is a perspective view of an optical connector according to one or more embodiments. FIG. 2 is an exploded view of the optical connector. FIG. 3 is a view taken along a vertical plane passing through a line in FIG. 1 and viewed in a direction of arrows in a state where a pair of optical connectors is connected using a coupler. By bringing a pair of optical connectors 20 face to face each other and coupling the optical connectors 20, an optical signal can be transmitted between optical cables 10.

In FIG. 1, the optical connector 20 to which the multicore (here, 60-core) optical cable 10 is coupled includes a ferrule 21 main body and a lens plate 30 as an optical element. The ferrule 21 made of a thermosetting resin containing a glass fiber has an approximately rectangular parallelepiped shape and includes an enlarged portion 21a on an end side to which the optical cable 10 is coupled. The optical cable 10 is formed by protecting 60 optical fibers 11 including a core and a clad with a coating portion 12 (see FIG. 3).

As illustrated in FIG. 3, an end hole 21b into which an end portion of the optical cable 10 is inserted is provided in an interior of each enlarged portion 21a. A plurality of through holes 21c is formed to extend in a longitudinal direction of the ferrule 21 from a bottom portion of the end hole 21b. The optical fiber 11 extending from an inside of the optical cable 10 is held in an inside of the through hole 21c. The optical fiber 11 is for single mode, and a tip end of the optical fiber 11 is exposed to an end surface 21d on an opposite side of the enlarged portion 21a as illustrated in FIG. 2.

In FIG. 2, circular openings (holes) 21e are formed in both sides in a right and left direction of a group of the through holes 21c through which the tip ends of the optical fibers 11 are exposed. Around shaft (shaft) 22 is inserted (implanted) in the circular opening 21e, and a tip end of the round shaft 22 can protrude from the end surface 21d.

In FIG. 2, the lens plate 30 includes an optical portion 30a having a rectangular plate shape made of glass, and a holder 30b having a rectangular frame shape made of a resin. The holder 30b includes a rectangular opening 30e in the center, and the optical portion 30a is fitted and arranged in a predetermined position inside the rectangular opening 30e. A plate thickness t1 of the optical portion 30a is smaller than a plate thickness t2 of the holder 30b (t1<t2).

In the optical portion 30a, lens surfaces 30c arranged in an array manner in 5 rows and 12 columns are formed, and the lens surfaces 30c facing each other in front and rear faces have a biconvex shape with a coincident optical axis and form a lens. The optical portion 30a is formed by glass molding, and a periphery of the optical portion 30a is adjusted to have a shape conforming to the rectangular opening 30e by machining after molding. Note that it is favorable to form an antireflection film on a surface including the lens surfaces 30c of the optical portion 30a so that a loss at the time of communication can be suppressed.

Meanwhile, the holder 30b is formed of a resin containing a glass fiber by injection molding or the like. Circular holes 30d are respectively formed in right and left sides of the rectangular opening 30e of the holder 30b. The diameter of the circular hole 30d is equal to the diameter of the round shaft 22 (see FIG. 2). Since the resin containing a glass fiber used in the holder 30b has a smaller linear expansion coefficient difference with respect to glass than a resin containing no glass fiber, the influence of thermal expansion at the time of environmental temperature change is small. Note that the lens plate 30 may be manufactured by molding the holder 30b while setting the optical portion 30a made by glass molding in a mold as an insert.

Next, an assembling mode and a coupling mode for the optical connector 20 will be described. Here, as illustrated in FIG. 2, it is assumed that the end portion of the optical cable 10 is coupled to the end hole 21b of the ferrule 21, and the tip end of the optical fiber 11 is exposed to the end surface 21d. When assembling the optical connector 20, the lens plate 30 is manufactured by fitting and arranging the optical portion 30a at a fixed position in the rectangular opening 30e of the holder 30b, using a jig or the like. Next, the round shaft 22 is inserted through the circular opening 21e of the ferrule 21, the protruding end portion of the round shaft 22 is engaged with the circular hole 30d of the lens plate 30 to bring one surface of the holder 30b into contact with the end surface 21d of the ferrule 21. At this time, since t1<t2 is satisfied, there is no risk that an apex of the lens surface interferes with the end surface 21d, and a predetermined clearance can be secured therebetween. Further, each lens surface 30c is positioned with reference to a middle point of a center line of the pair of circular holes 30d with high precision, and the end portion of the optical fiber 11 held in the through hole 21c is also positioned with reference to a middle point of a center line of the pair of circular openings 21e with high precision. Therefore, an optical axis of each lens surface 30c and a center of the end portion of the optical fiber 11 facing the lens surface 30c can be brought into accord with each other with high precision.

Further, when coupling the optical connectors 20 with each other, couplers 41 and 42 illustrated in FIG. 3 are used. The couplers 41 and 42 have casing shapes with one end open, and have flange portions 41a and 42a on the open end side and lead-out holes 41c and 42c in close ends 41b and 42b on opposite side of the open ends, respectively. An engagement recessed portion 41d is formed in a facing surface of the flange portion 41a, and an engagement protruding portion 42d corresponding to the engagement recessed portion 41d is formed on a facing surface of the flange portion 42a.

As illustrated in FIG. 3, the ferrules 21 are respectively housed in insides of the couplers 41 and 42, and the optical cables 10 are pulled out to the outside via the lead-out holes 41c and 42c. At this time, the enlarged portions 21a of the ferrules 21 are fitted to inner peripheral walls of the close ends 41b and 42b, and the ferrules 21 are positioned with respect to the couplers 41 and 42. In this state, the lens plates 30 are exposed to the open ends of the couplers 41 and 42.

When the engagement protruding portion 42d of the flange portion 42a is engaged with the engagement recessed portion 41d of the flange portion 41a to bring the flange portions 41a and 42a into close contact with each other, the holders 30b of the facing lens plates 30 come in contact with each other. At this time, since t1<t2 is satisfied, there is no risk that apexes of the lens surfaces interfere with each other, and a predetermined clearance can be secured therebetween. With the engagement between the engagement recessed portion 41d and the engagement protruding portion 42d, the optical axes of the facing lens surfaces 30c accord with each other with high precision. As a result, the pair of optical connectors 20 can be joined via the couplers 41 and 42 with high precision. Although not clearly illustrated, the clearance between the circular opening 21e of the ferrule 21 and the round shaft 22 is equal to or smaller than the clearance between the round shaft 22 and the circular hole 30d of the lens plate 30, and further, the clearance between the round shaft 22 and the circular hole 30d is smaller than the clearance between an engaging portion of the optical cable 10 and the coupler 41 or 42.

In FIG. 3, light (for example, light having any one of wavelengths 850 nm, 1310 nm, and 1550 nm) propagating in the optical fiber 11 of one of the optical cables 10 is emitted from the end portion of the ferrule 21 and enters one of the lens plates 30 in a state of divergent light, and is emitted as collimated light. The emitted collimated light enters the other lens plate 30, and convergent light is emitted. The convergent light is focused on the end portion of the optical fiber 11 of the other ferrule 21, and is transmitted from the end portion via the other optical cable 10. Since the diameter of the collimated light is enlarged to about 5 times the core diameter of the optical fiber 11 of the single mode, even if optical axis deviation occurs between the pair of lens plates 30, the influence of the deviation can be suppressed.

According to one or more embodiments, the optical portion 30a is made of glass and thus are excellent in optical characteristics and temperature characteristics, and the linear expansion coefficient can approximate those of the ferrule 21 made of a resin containing a glass fiber and the optical fiber 11. Therefore, a loss due to misalignment of a coupled portion at the time of environmental temperature change can be suppressed. Meanwhile, the holder 30b is made of a resin, and thus formation of the circular hole 30d becomes easy, and the holder 30b can be coupled with the ferrule 21 via the round shaft 22 with high precision.

Figure 4:
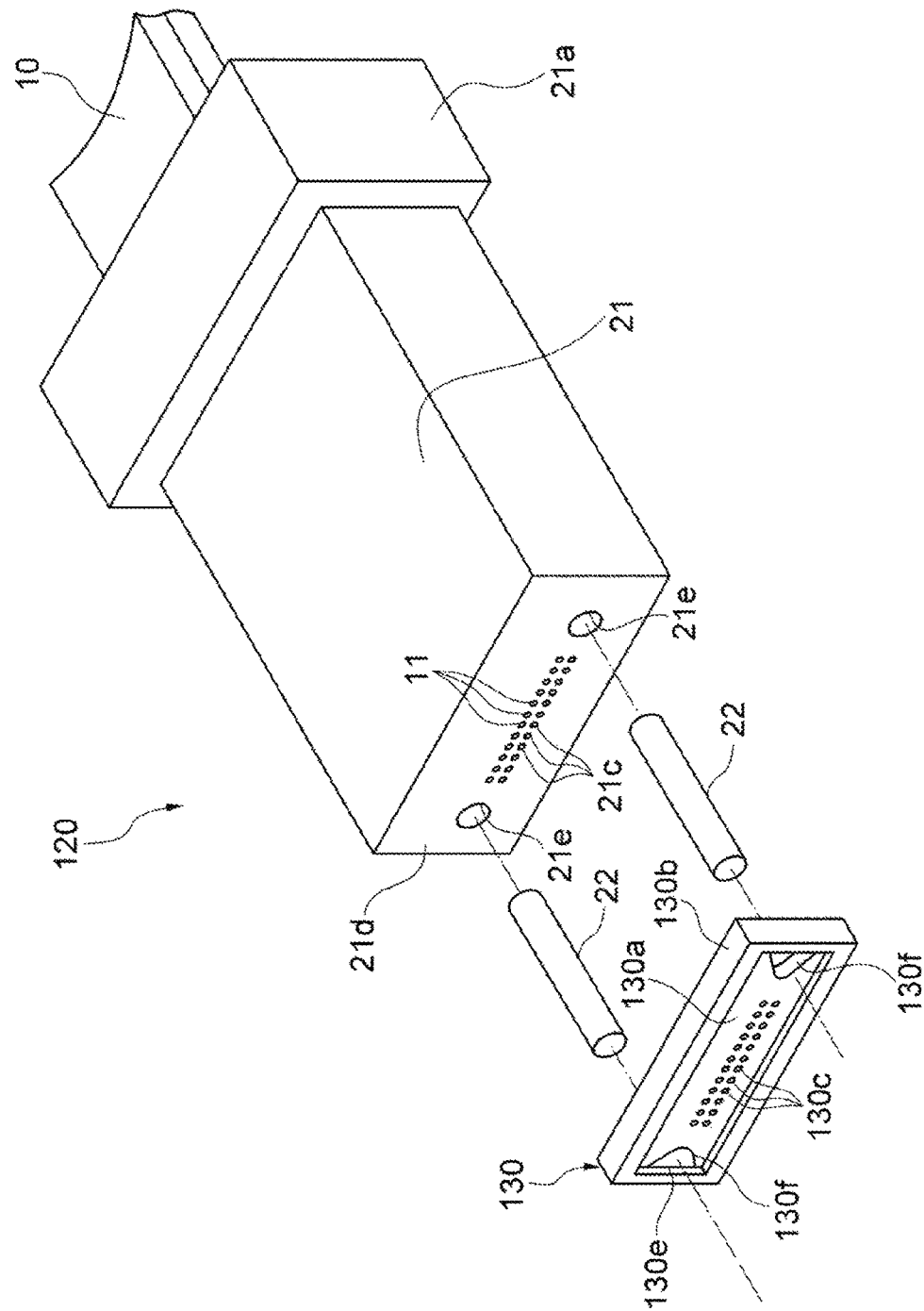
FIG. 4 is an exploded view of an optical connector according to one or more embodiments.
Figure 5:
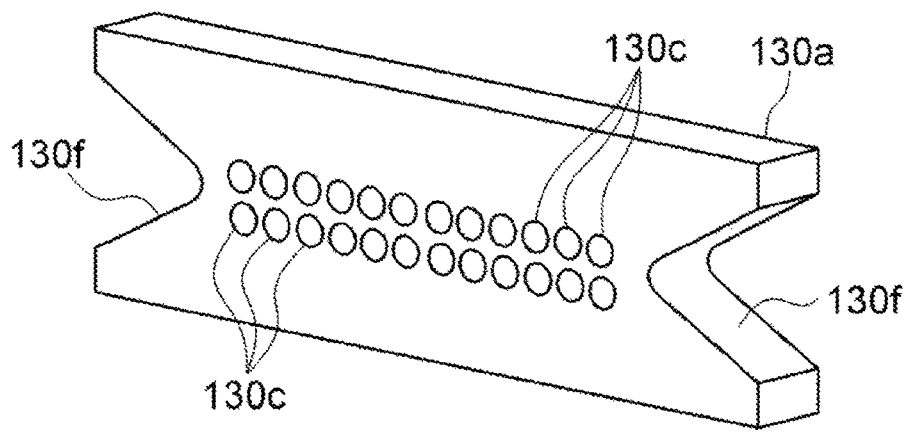
FIG. 5 is a perspective view illustrating an optical portion of a lens plate (optical element) used for the optical connector according to one or more embodiments.
Figure 6:
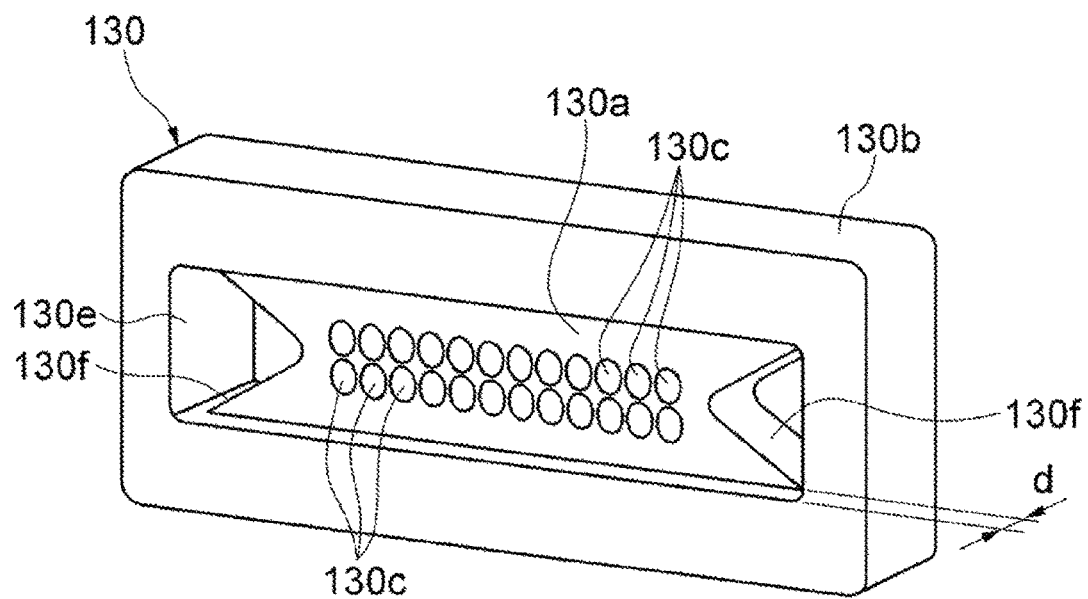
FIG. 6 is a perspective view illustrating the lens plate used for the optical connector according to one or more embodiments.

FIG. 4 is an exploded view of an optical connector according to one or more embodiments. FIG. 5 is a perspective view illustrating an optical portion 130a of a lens plate (optical element) 130 used for an optical connector 120 according to one or more embodiments. FIG. 6 is a perspective view illustrating the lens plate 130 used for the optical connector 120 according to one or more embodiments. An optical cable 10, a ferrule 21, and a round shaft 22 are similar to those used in one or more embodiments described above, but the optical cable 10 has 24 cores and through holes 21c of the ferrule 21 are arranged in 2 rows and 12 columns corresponding to the 24 cores.

The optical portion 130a illustrated in FIG. 5 has a plate shape made of a glass mold, and includes lens surfaces 130c arranged in an array manner in 2 rows and 12 columns in both surfaces, and forms V-shaped notches 130f in both side surfaces thereof. A setting angle of the notch 130f is favorably 60°±20°. Glass is generally inferior in moldability as compared with a resin. Therefore, the formation of the notch instead of a hole reduces the burden at the time of molding and contributes to cost reduction.

In FIG. 6, the lens plate 130 formed by insert molding as described below includes the optical portion 130a and a holder 130b having a rectangular frame shape and formed around the optical portion 130a. The lens plate 130 has a symmetrical shape with respect to a center plane in a thickness direction. The holder 130b includes a rectangular opening 130e through which the lens surfaces 130c are exposed, and has a shape that sandwiches the vicinity of an upper edge and a lower edge of the optical portion 130a from both sides and surrounds a periphery of the optical portion 130a. At this time, a triangular prismatic space is caused between the notch 130f and the holder. When the optical portion 130a and the holder 130b are joined by insert molding, mutual positioning can be performed with high precision, whereby precision after assembly of the optical connector 120 can be highly maintained.

Figure 7A:
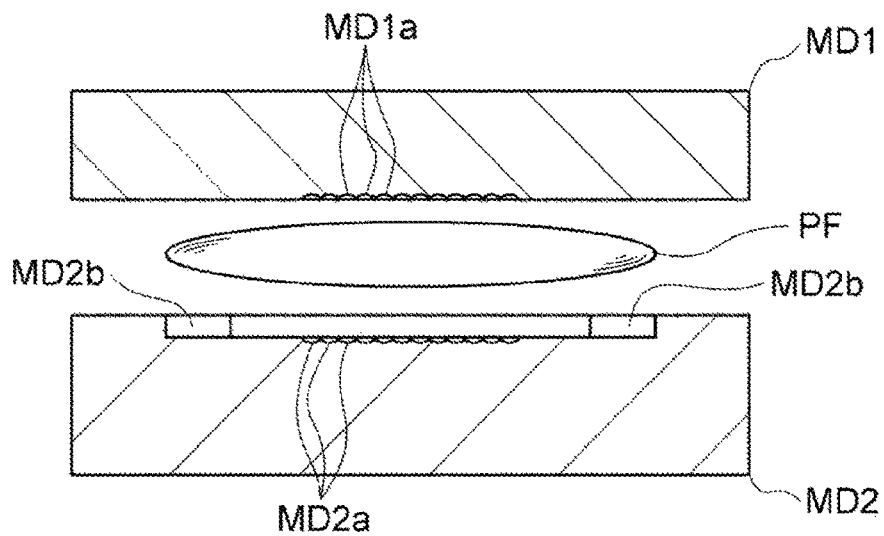
FIGS. 7A to 7C are views illustrating a reheat molding process of an optical portion in accordance with one or more embodiments.
Figure 7B:
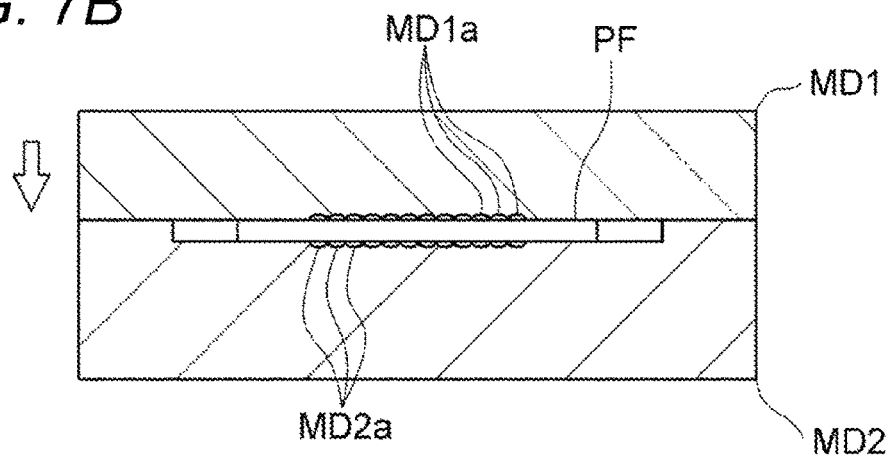
Figure 7C:
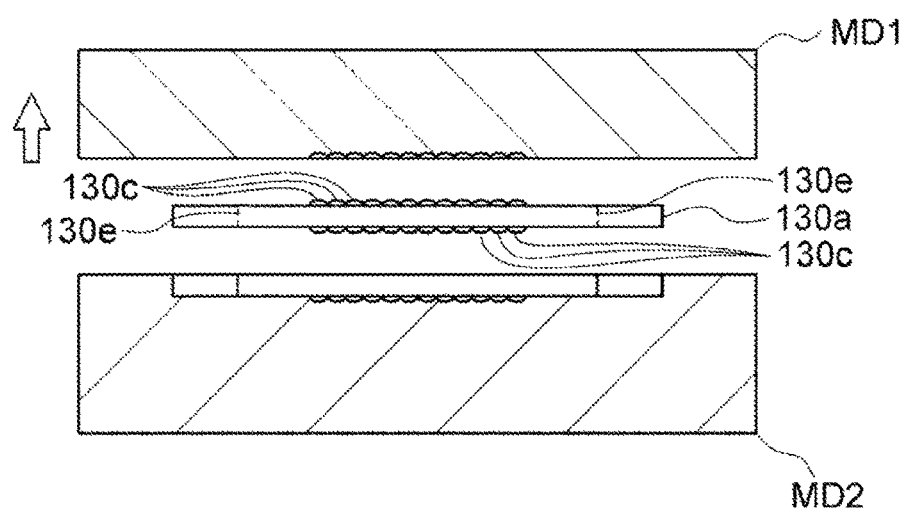

Next, a molding process of the lens plate 130 will be described. FIGS. 7A to 7C are views illustrating a reheat molding process of the optical portion 130a. In FIG. 7A, an upper mold MD1 has an optical surface transfer surface MD1a corresponding to one of the lens surfaces 130c. In contrast, a lower mold MD2 has an optical surface transfer surface MD2a corresponding to the other lens surface 130c and a notch transfer surface MD2b corresponding to a V-shaped notch. The optical surface transfer surface MD2a and the notch transfer surface MD2b are simultaneously machined into the single lower mold MD2, whereby a positional relationship between the lens surface 130c and the notch 130f transferred and formed by the machining can be determined with high precision.

The optical surface transfer surfaces MD1a and MD2a are brought to face each other in a state where a glass preform PF is interposed therebetween, as illustrated in FIG. 7A, and the upper mold MD1 is brought close to the lower mold MD2 and mold clamping is performed while the upper mold MD 1 and the lower mold MD 2 are heated, and cooling and solidification are performed, as illustrated in FIG. 7B.

After that, the upper mold MD1 is separated from the lower mold MD2, thereby to release the optical portion 130a in which the lens surface 130c and the notch 130f are formed, as illustrated in FIG. 7C.

Figure 8A:
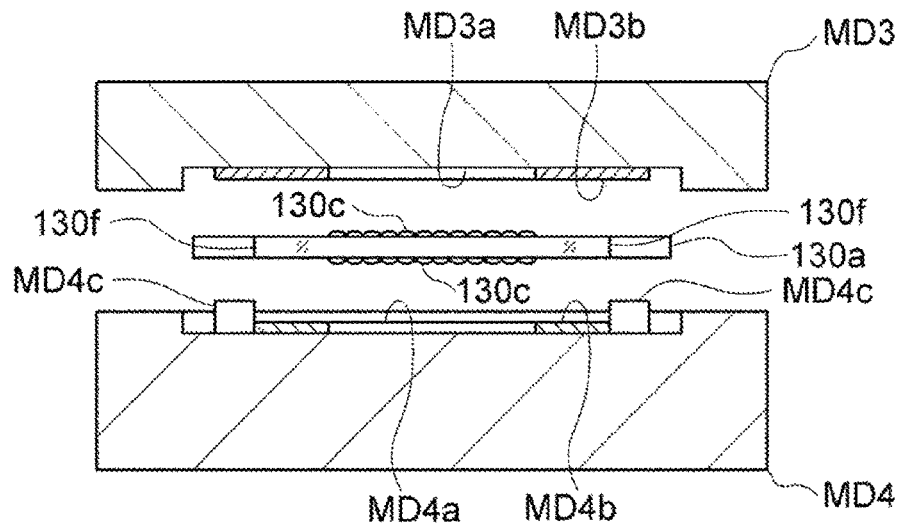
FIGS. 8A to 8C are views illustrating an insert molding process of the lens plate in accordance with one or more embodiments.
Figure 8B:
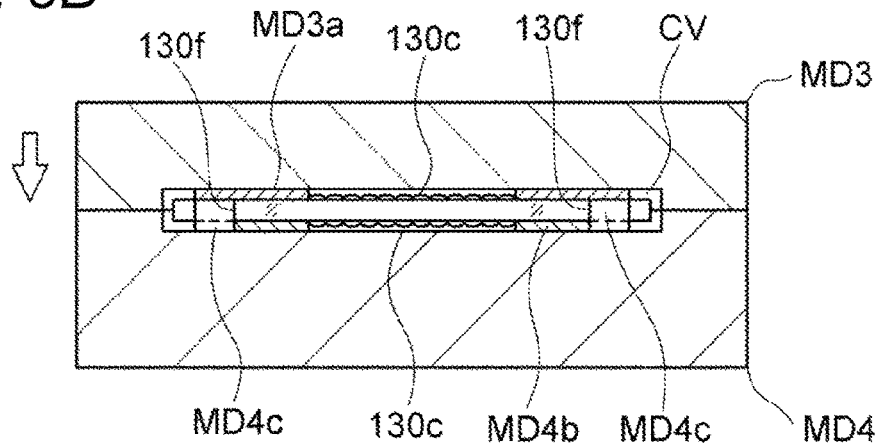
Figure 8C:
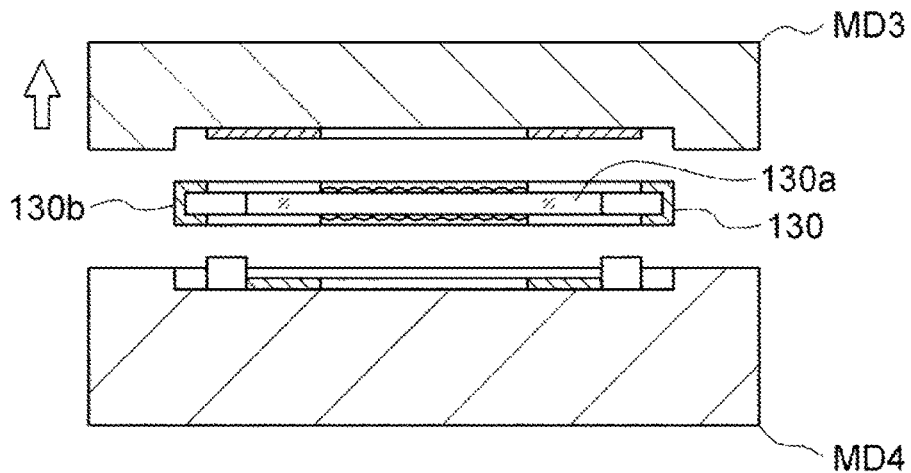

FIGS. 8A to 8C are views illustrating an insert molding process of the lens plate 130. In FIG. 8A, an upper mold MD3 has a recessed portion transfer surface MD3a corresponding to one surface of the holder 130b and a frame portion MD3b that prevents a resin from flowing into the lens surface 130c. In contrast, a lower mold MD4 has a recessed portion transfer surface MD4a corresponding to the other surface of the holder 130b, a frame portion MD4b that prevents a resin from flowing into the lens surface 130c, and a columnar portion MD4c to be fitted with the notch 130f for positioning the optical portion 130a.

The columnar portions MD4c are respectively fitted into the pair of notches 130f of the optical portion 130a formed in the previous process, and the optical portion 130a is placed on the lower mold MD4 such that the frame portion MD4b comes in contact with a peripheral surface of the lower lens surface 130c. Further, as illustrated in FIG. 8B, the recessed portion transfer surfaces MD3a and MD 4a are brought to face each other and are clamped. At this time, the frame portion MD3b comes in contact with the peripheral surface of the upper lens surface 130c. Thereafter, a molten thermoplastic resin (favorably containing a glass fiber) is filled through a gate (not illustrated) into a cavity CV formed between the clamped lower mold MD4 and upper mold MD3, and the resin is solidified.

After that, the upper mold MD3 is separated from the lower mold MD4, thereby to release the lens plate 130 in which the optical portion 130a is enclosed by the holder 130b, as illustrated in FIG. 8C. When the optical portion 130a is formed while giving priority to the shape precision of the lens surface 130c in reheat molding, an outer periphery of the optical portion 130a is often formed into a shape having overall dimensions obtainable from the material. If an unnecessary portion of the outer periphery is cut by machining in a subsequent process, the process requires a cost. On the other hand, according to one or more embodiments, the periphery of the molded optical portion 130a is enclosed by the holder 130b, thereby to secure appearance quality of the lens plate 130 while omitting machining of the optical portion 130a. Further, in the case where the lens plate 130 is carelessly dropped, for example, the holder 130b exerts shock absorbing properties, thereby to suppress a risk of occurrence of damage in the glass optical portion 130a. Note that it is favorable to form an antireflection film on a surface including the lens surfaces 130c of the optical portion 130a so that a loss at the time of communication can be suppressed.

Next, an assembling mode and a coupling mode for the optical connector 120 will be described. Here, as illustrated in FIG. 4, it is assumed that an end portion of the optical cable 10 is coupled to an end hole 21b of the ferrule 21, and a tip end of the optical fiber 11 is exposed to an end surface 21d.

Figure 9:
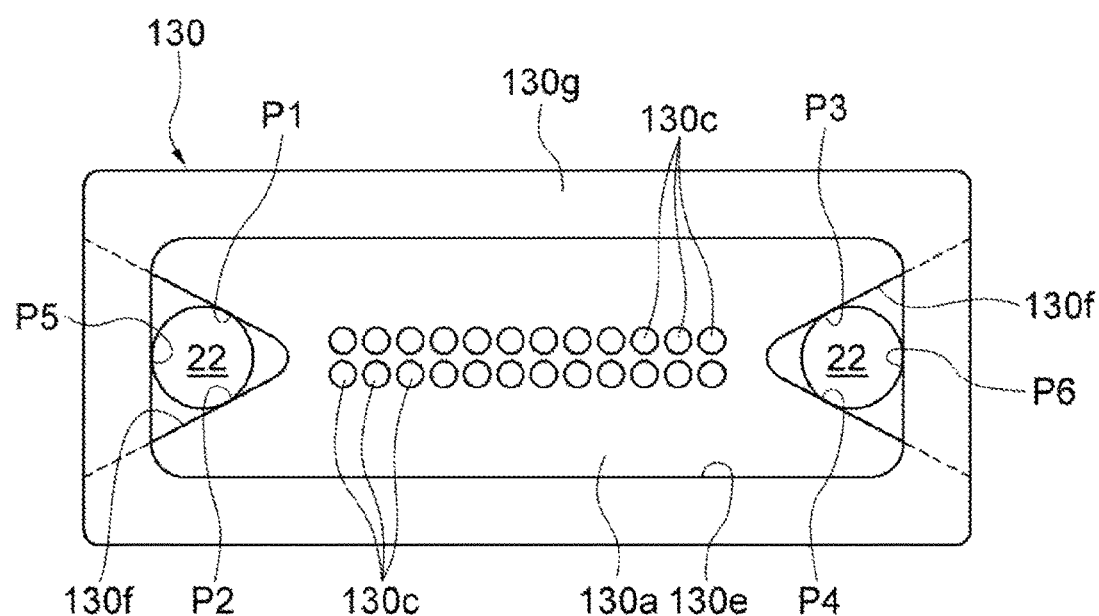
FIG. 9 is a front view of the lens plate engaged with round shafts in accordance with one or more embodiments.

At the time of assembly of the optical connector 20, the round shaft 22 is inserted through a circular opening 21e of the ferrule 21, and a protruding end portion of the round shaft 22 is engaged with the space between the notch 130f of the lens plate 130 and the holder 130b. FIG. 9 illustrates a front view (a view seen in an axial direction of the round shaft 22) of the lens plate 130 engaged with the round shaft 22.

In FIG. 9, a right-half outer peripheral surface of the left round shaft 22 is in contact with the notch 130f at two points P1 and P2. On the other hand, a left-half outer peripheral surface of the right round shaft 22 is in contact with the notch 130f at two points P3 and P4. Thereby, the optical portion 130a is positioned with respect to the round shafts 22 with high precision.

Further, each lens surface 130c is positioned with reference to a middle point of a center line of the pair of notches 130f with high precision, and the end portion of the optical fiber 11 held in the through hole 21c is also positioned with reference to a middle point of a center line of the pair of circular openings 21e with high precision. Therefore, an optical axis of each lens surface 130c and a center of the end portion of the optical fiber 11 facing the lens surface 130c can be brought into accord with each other with high precision.

At this time, a left end of the left round shaft 22 is in contact with a left inner side surface (P5) of the rectangular opening 130e of the holder 130b, and a right end of the right round shaft 22 is in contact with a right inner side surface (P6) of the rectangular opening 130e. With adjustment of the dimension of the rectangular opening 130e, predetermined elastic deformation can be imparted to the left inner side surface and the right inner side surface of the rectangular opening 130e, and a surface pressure with the round shaft 22 can be set to fall within an appropriate range. Therefore, a force in pulling out (or inserting) the lens plate 130 from (or into) the round shaft 22, that is, a so-called extraction force can be set to a desired value. Further, an opening side of the notch 130f is closed by the holder 130b, whereby the lens plate 130 is not carelessly dropped from the round shaft 22, and handling becomes easy.

Further, planes of the optical portion 130a where the lens surfaces 130c are formed are formed at positions of a depth d (see FIG. 6) from both surfaces of the holder 130b. Therefore, an apex of the lens surface does not interfere with the end surface 21d of the ferrule 21, and a predetermined clearance can be secured therebetween.

Further, when coupling the optical connectors 120 with each other, couplers 41 and 42 similar to those illustrated in FIG. 3 can be used. When flange portions of the couplers 41 and 42 respectively housing the optical connectors 120 are brought into close contact with each other, the holders 130b of the facing lens plates 130 come in contact with each other. At this time, planes of the optical portion 130a where the lens surfaces 130c are formed are formed at positions of a depth d (see FIG. 6) from both surfaces of the holder 130b. Therefore, apexes of lens surfaces do not interfere with each other, and a predetermined clearance can be secured therebetween. Other configurations are similar to those in one or more embodiments described above.

According to one or more embodiments of the present invention, there can be provided an optical connector and an optical element used for the optical connector, which are inexpensive and capable of suppressing a loss at the time of environmental temperature change.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An optical element coupled to a ferrule that holds an optical fiber for single mode, the optical element comprising:
   a glass-made optical portion;
   a plurality of lenses disposed in the optical portion; and
   a resin-made holder that holds the optical portion, wherein
   the lenses are disposed with respect to an end portion of the optical fiber, using at least a part of the holder, wherein
   a shaft is inserted in the ferrule,
   the optical portion has a notch,
   and the optical element is coupled to the ferrule by engaging the shaft with the notch and the holder.

2. The optical element according to claim 1, wherein the holder has a hole, and
   the optical element is coupled to the ferrule by engaging the shaft with the hole.

3. The optical element according to claim 1, wherein the notch and the shaft are in contact with each other at two points along an axial direction of the shaft.

4. The optical element according to claim 1, wherein the resin contains a glass fiber.

5. The optical element according to claim 1, wherein the optical portion is molded by glass molding, and the holder is molded with the resin or another resin while the molded optical portion is inserted in the holder.

6. The optical element according to claim 5, wherein the molded holder sandwiches at least a part of the optical portion.

7. The optical element according to claim 1, wherein the lenses are arranged in an array.

8. The optical element according to claim 1, wherein an antireflection film is disposed on the lenses.

9. An optical connector comprising the optical element and the ferrule according to claim 1.

* * * * *